(12) United States Patent
Chretien

(10) Patent No.: US 9,641,115 B2
(45) Date of Patent: May 2, 2017

(54) METHODS AND SYSTEMS FOR ENVELOPE AND EFFICIENCY CONTROL IN AN ELECTRIC MOTOR

(71) Applicant: Regal Beloit America, Inc., Beloit, WI (US)

(72) Inventor: Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 32 days.

(21) Appl. No.: 14/138,796

(22) Filed: Dec. 23, 2013

(65) Prior Publication Data

US 2015/0180401 A1 Jun. 25, 2015

(51) Int. Cl.
 *H02P 21/00* (2016.01)
 *H02P 21/05* (2006.01)
 *H02P 21/02* (2006.01)
 *H02P 21/24* (2016.01)

(52) U.S. Cl.
 CPC .............. *H02P 21/05* (2013.01); *H02P 21/02* (2013.01); *H02P 21/24* (2016.02)

(58) Field of Classification Search
 CPC .............. H02P 21/003; H02P 21/0035; H02P 21/0039; H02P 21/005; H02P 21/0067; H02P 21/0096; H02P 21/06
 USPC ....................................... 318/400.02, 400.04
 See application file for complete search history.

(56) References Cited

U.S. PATENT DOCUMENTS

| 4,761,600 | A | 8/1988 | D'Atre et al. |
| 5,818,194 | A | 10/1998 | Nordby |
| 6,215,261 | B1 | 4/2001 | Becerra |
| 6,768,284 | B2 | 7/2004 | Lee et al. |
| 6,828,746 | B2 | 12/2004 | Kumar |
| 7,095,208 | B2 | 8/2006 | Kawaji et al. |
| 7,557,543 | B2 | 7/2009 | Prakash et al. |
| 7,650,760 | B2 * | 1/2010 | Nakata et al. ............... 62/228.1 |
| 7,670,253 | B2 | 3/2010 | Sah |

(Continued)

FOREIGN PATENT DOCUMENTS

| EP | 1429450 B1 | 2/2008 |
| EP | 1843463 B1 | 7/2013 |

(Continued)

*Primary Examiner* — Bentsu Ro
*Assistant Examiner* — Bickey Dhakal
(74) *Attorney, Agent, or Firm* — Armstrong Teasdale LLP

(57) ABSTRACT

An air moving system including an electric motor, a load coupled to the electric motor, and a motor drive controller coupled to the electric motor is provided. A DC voltage generated from an AC input voltage provided to the electric motor tends towards zero at about twice a frequency of the AC input voltage. The motor drive controller includes an adjustment control module configured to receive a measurement of an instantaneous motor current value for the electric motor, determine a flux component value based on the instantaneous motor current value, and determine, based at least in part on the flux component value and a flux component demand value, an adjusted flux component demand value that causes the motor drive controller to adjust an operation such that an average flux component value based on the flux component value is substantially similar to the flux component demand value.

18 Claims, 12 Drawing Sheets

(56) References Cited

U.S. PATENT DOCUMENTS

| | | | |
|---|---|---|---|
| 7,739,016 B2 | 6/2010 | Morris | |
| 7,865,287 B2 | 1/2011 | Huseman | |
| 7,908,064 B2 | 3/2011 | Cawthorne et al. | |
| 7,977,896 B2 | 7/2011 | Heap et al. | |
| 7,987,934 B2 | 8/2011 | Huseman | |
| 7,990,092 B2 | 8/2011 | Woodward | |
| 8,010,263 B2 | 8/2011 | Morris | |
| 8,049,459 B2 | 11/2011 | Woodward | |
| 8,050,821 B2 | 11/2011 | Morris et al. | |
| 8,140,230 B2 | 3/2012 | Haggerty et al. | |
| 8,195,352 B2 | 6/2012 | Morris | |
| 8,269,445 B2* | 9/2012 | Patel et al. | 318/400.37 |
| 8,723,462 B2* | 5/2014 | Jang | 318/400.04 |
| 2010/0194329 A1* | 8/2010 | Lu | H02P 21/16 |
| | | | 318/798 |
| 2011/0181231 A1* | 7/2011 | Ito et al. | 318/801 |
| 2013/0009575 A1* | 1/2013 | Yoo | 318/400.02 |

FOREIGN PATENT DOCUMENTS

| | | |
|---|---|---|
| JP | 4416486 B2 | 2/2012 |
| KR | 101006589 B1 | 1/2011 |

\* cited by examiner

METHODS AND SYSTEMS FOR ENVELOPE AND EFFICIENCY CONTROL IN AN ELECTRIC MOTOR

BACKGROUND OF THE DISCLOSURE

The field of the invention relates generally to electric motors, and more specifically, to methods and systems for envelope and efficiency control in motors using low capacitance.

Typical electric motor systems include a motor drive controller and an electric motor. The motor drive controller receives power from an alternating current (AC) power supply, and applies the power to a rectifier and to capacitors to generate a smoothed direct current (DC) voltage. The motor drive controller then supplies a chopped DC voltage to the electric motor through an inverter, which uses the power to drive a load.

Capacitors typically used in motor drive controllers include electrolytic capacitors with high capacitances (about several hundred μF). The high capacitances cause the capacitors of the motor drive controller to be large and expensive. Such capacitors may necessitate a larger motor drive controller and may reduce the lifespan of the motor drive controller. New drive technologies target having substantially reduced capacitance capacitors to reduce the size and expense of the motor drive controller. However, as the energy storage elements (capacitors) have been reduced in the motor drives controllers, motor phase currents may not reach typical steady state waveforms and torque production may have a ripple component that varies in amplitude as a function of a motor load point and an input voltage to the motor drive controller. Typical control algorithms regulating steady state motor currents cannot deliver constant average torque performance or a constant average flux value, which is related to the efficiency of the electric motor. Accordingly, implementing a typical control algorithm in a motor drive controller that does not include one or more electrolytic capacitors with high capacitances (several hundred μF) may result in a loss of torque, efficiency, and envelope control.

BRIEF DESCRIPTION OF THE DISCLOSURE

In one aspect, an electric motor drive controller configured to be coupled to an electric motor is provided. The electric motor drive controller includes a rectifier configured to convert an AC input voltage having a frequency to a DC voltage, wherein the DC voltage tends towards zero at about twice the frequency of the AC input voltage, a DC link electrically coupled to the rectifier, an inverter electrically coupled to the DC link and configured to generate a three phase pulse width modulated (PWM) voltage to drive the electric motor, and an adjustment control module. The adjustment control module is configured to receive a measurement of an instantaneous motor current value for the electric motor, determine a flux component value based on the instantaneous motor current value, and determine, based at least in part on the flux component value and a flux component demand value, an adjusted flux component demand value that causes the motor drive controller to adjust an operation such that an average flux component value based on the flux component value is substantially similar to the flux component demand value.

In another aspect, a method of controlling an electric motor using a motor drive controller that includes an adjustment control module is provided. The electric motor is configured to be coupled to a power supply and to a load. The power supply provides an AC input voltage having a frequency, and a DC voltage generated from the AC input voltage tends towards zero at about twice the frequency of the AC input voltage. The method includes receiving a measurement of an instantaneous motor current value for the electric motor, determining a flux component value based on the instantaneous motor current value, and determining, based at least in part on the flux component value and a flux component demand value, an adjusted flux component demand value that causes the motor drive controller to adjust an operation such that an average flux component value based on the flux component value is substantially similar to the flux component demand value.

In yet another aspect, an air moving system including an electric motor, a load coupled to the electric motor, and a motor drive controller coupled to the electric motor is provided. A DC voltage generated from an AC input voltage provided to the electric motor tends towards zero at about twice a frequency of the AC input voltage. The motor drive controller includes an adjustment control module configured to receive a measurement of an instantaneous motor current value for the electric motor, determine a flux component value based on the instantaneous motor current value, and determine, based at least in part on the flux component value and a flux component demand value, an adjusted flux component demand value that causes the motor drive controller to adjust an operation such that an average flux component value based on the flux component value is substantially similar to the flux component demand value.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of the disclosure by way of example and not by way of limitation. It is contemplated that the disclosure has general application to operating electronically commutated motors.

Embodiments of the present disclosure relate to an improved system for controlling an electronically commutated motor (ECM). A typical electric motor drive controller with a passive front end (i.e. without front end switching elements) includes a bridge rectifier with one or more electrolytic capacitors with capacitances of several hundred μF to rectify the AC voltage into a DC voltage. An inverter stage then modulates the DC voltage to provide three-phase voltages to the ECM. The one or more capacitors are sized so as to reduce or substantially eliminate DC voltage ripple when the ECM is operating. The typical motor drive controller may monitor electrical currents to regulate the parameters of the electric motor, for example torque and speed.

In the embodiments of motor drive controllers described herein, the above-described capacitors of several hundred μF ("high capacitance") are absent. Accordingly, embodiments of motor drive controllers described herein pertain to "low capacitance" control of an electric motor. As a result of excluding high capacitance capacitors, a DC link voltage in the motor drive controller is not constant, but rather tends towards zero volts on a periodic basis. Accordingly, embodiments of motor drive controllers described herein are configured to compensate for the time-varying DC link voltage to maintain a constant average torque, increase efficiency over known control strategies, and provide accurate machine envelope and/or operating space control.

The following description refers to the accompanying drawings, in which, in the absence of a contrary representation, the same numbers in different drawings represent similar elements.

Figure 1:
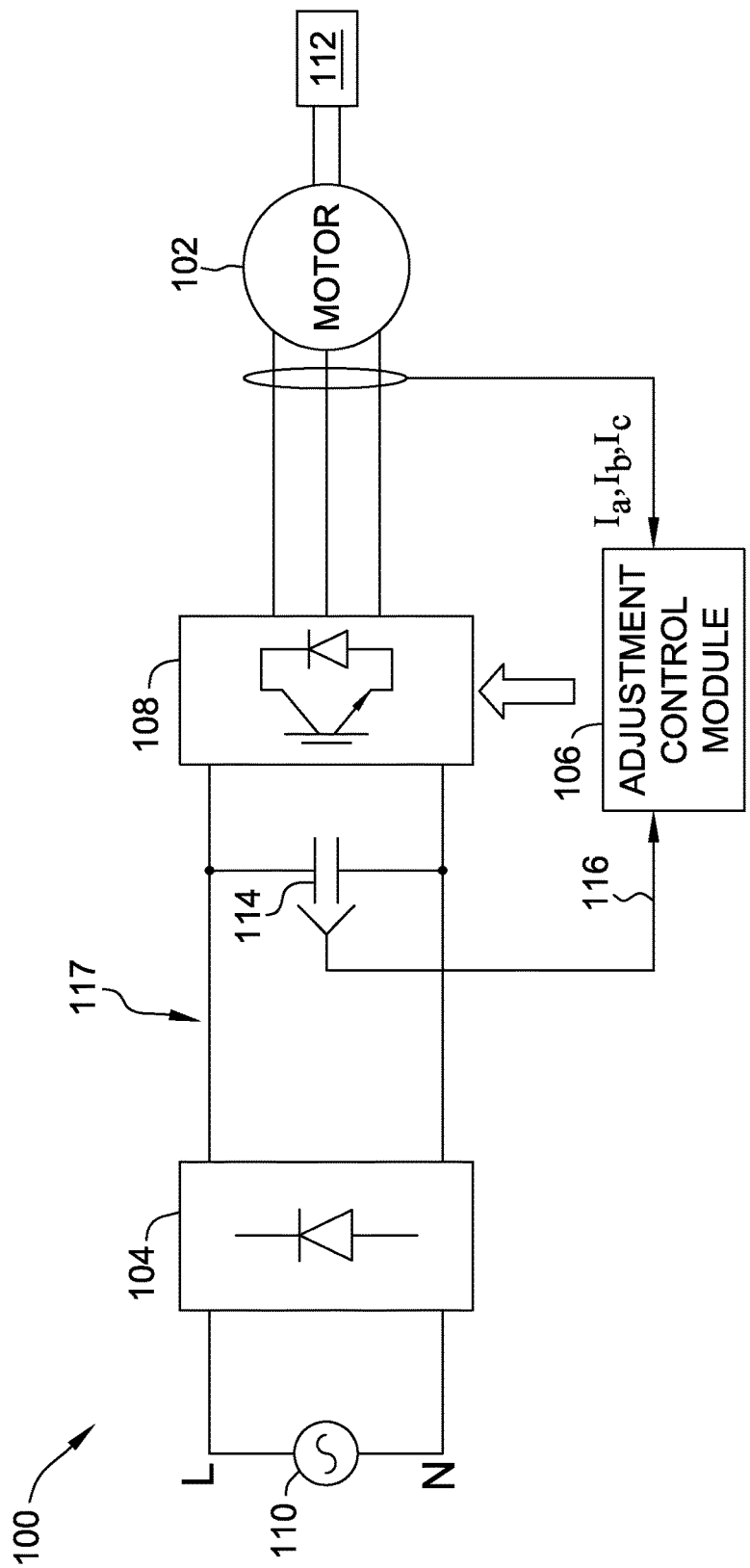
FIG. 1 is a functional diagram that includes a motor drive controller that may be used for operating an electric motor.

FIG. 1 is a functional diagram that includes a motor drive controller 100 that may be used for operating an electric motor 102. Motor drive controller 100 includes a rectifier 104, an adjustment control module 106, and an inverter 108. Motor drive controller 100 is coupled to a power supply 110 for receiving input power to drive electric motor 102. Electric motor 102 is coupled to and drives a load 112.

In the exemplary embodiment, power supply 110 supplies a single-phase alternating current (AC) input voltage to motor drive controller 100. However, power supply 110 may supply any other type of input voltage that enables motor drive controller 100 to function as described herein. Rectifier 104 receives the AC input voltage from a power supply 110 and rectifies the AC input voltage to produce a pulsed DC voltage. Inverter 108 conditions the pulsed DC voltage, and supplies it to electric motor 102, which uses the power to drive load 112. In the exemplary embodiment, inverter 108 converts the pulsed DC voltage to a three-phase AC voltage. Alternatively, inverter 108 converts the pulsed DC voltage to any type of voltage that enables motor drive controller 100 to function as described herein.

In some embodiments, motor drive controller 100 includes a low-capacitance capacitor 114 that stores relatively small amounts of energy when input voltage is available. Capacitor 114 may have a capacitance of, for example, between about 0.1 μF/kW and about 10 μF/kW. More specifically, motor drive controller 100 does not include a comparatively large electrolytic capacitor (i.e., a high capacitance capacitor). In some embodiments, capacitor 114 is configured to filter out switching frequency harmonics of electric motor 102. In other embodiments, the relatively low capacitance of capacitor 114 reduces inrush input current to electric motor 102. Further, capacitor 114 may enable motor drive controller 100 to increase a line input power factor. In other embodiments, motor drive controller 100 does not include capacitor 114.

Motor drive controller 100 is configured to measure a voltage of a DC link 117, for example, through a voltage divider or a voltage sensor 116 coupled across capacitor 114. In performing the method, motor drive controller 100 measures the voltage of DC link 117 downstream of rectifier 104. Adjustment control module 106 receives the measured voltage of DC link 117 and uses the measured voltage of DC link 117 in controlling electric motor 102 to produce torque to increase efficiency over known control strategies and control the envelope of electric motor 102.

Figure 2:
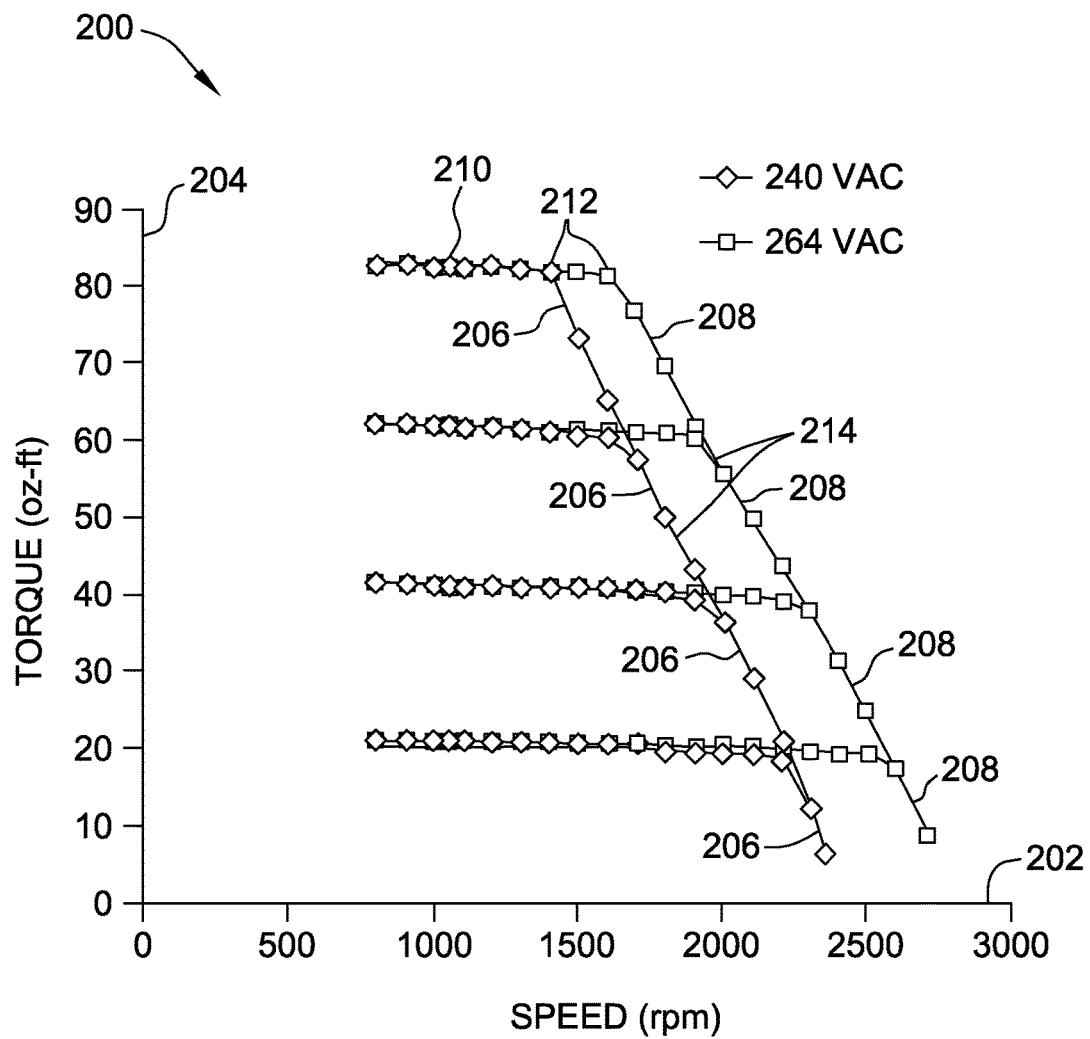
FIG. 2 is a graph of a torque/speed curve for a typical motor assembly that includes a typical capacitor.

FIG. 2 is a graph 200 of torque/speed curves for a typical motor assembly (not shown) that includes a typical high capacitance capacitor (not shown). More specifically, FIG. 2 is a graph 200 of torque/speed curves for a motor assembly that includes an electrolytic capacitor with relatively high capacitances (about several hundred μF) compared to the relatively low capacitance of capacitor 114 (FIG. 1) (about 0.1 μF/kW to about 10 μF/kW). Graph 200 includes an x-axis 202 graduated in units of rotational speed, expressed in rotations per minute (rpm) and a y-axis 204 graduated in units of torque expressed in oz.-ft. A first set 206 of traces represents torque vs. speed characteristics of the motor assembly operating at approximately 240 volts AC. Graph 200 also includes a second set 208 of traces representing torque vs. speed characteristics of the motor assembly operating at approximately 264 volts AC. Traces 206 and 208 include linear segments 210, knees 212, and negative-slope portions 214. More specifically, linear segments 210 represent that an output torque of the motor assembly is substantially constant through a range of speeds. At a given threshold speed, for example 1500 rpm, the output torque decreases. More specifically, each knee 212 represents where the output torque begins to decrease. At greater motor speeds, the output torque continues to decrease, as represented by negative slope portions 214. Additionally, as shown in graph 200, a higher input voltage (e.g., 264 volts AC) enables the motor assembly to output a constant torque at higher motor speeds compared to a lower input voltage (e.g., 240 volts AC).

In the exemplary embodiment, in order to approximate traces 206 and 208, motor drive controller 100 measures an input voltage, for example the AC input voltage from power supply 110 (FIG. 1) and/or the voltage of DC link 117, using voltage sensor 116, and regulates, in real time, a torque-producing component (q-axis) and a flux-producing component (d-axis) of phase currents Ia, Ib, and Ic provided to electric motor 102 (FIG. 1).

Figure 3:
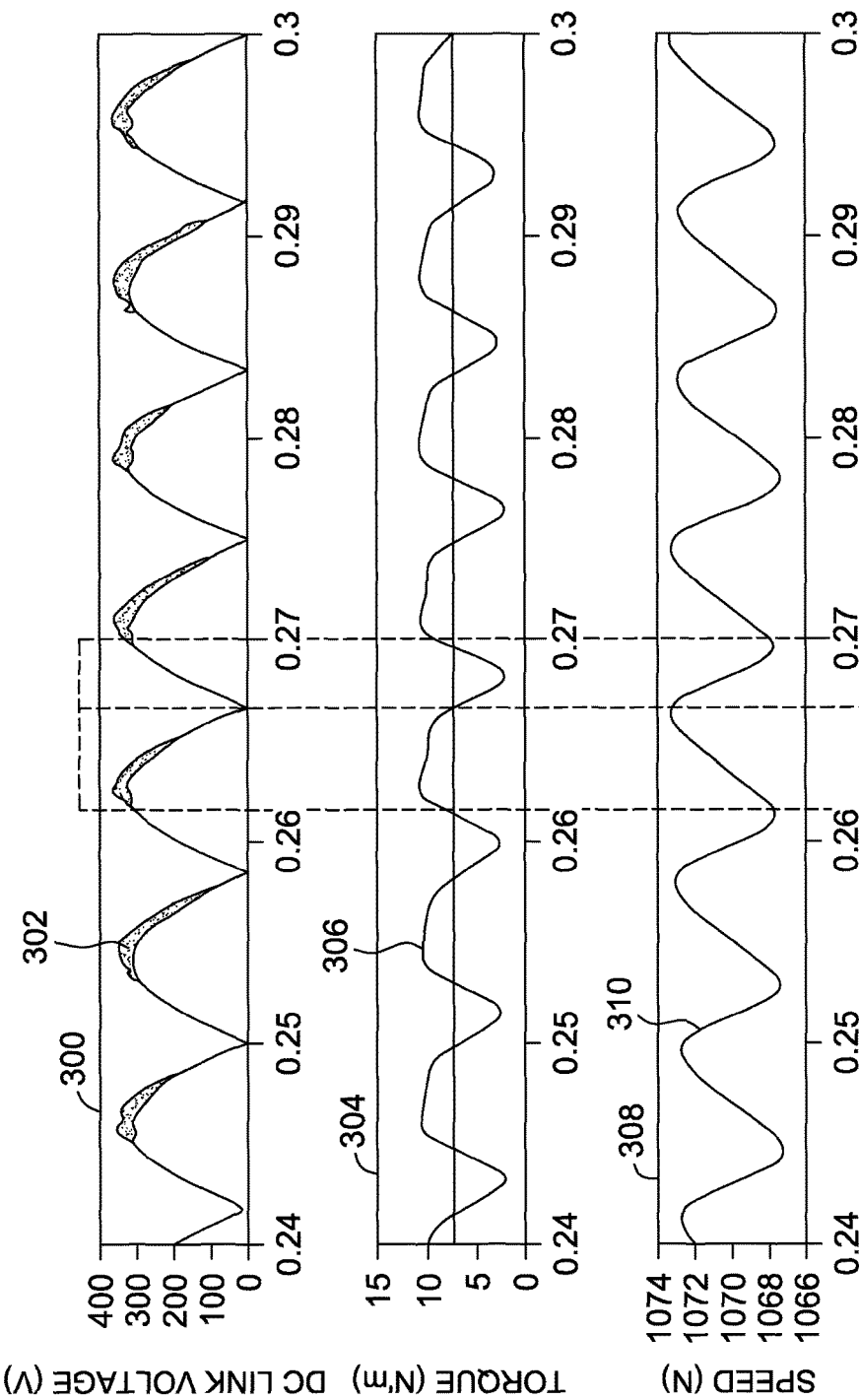
FIG. 3 illustrates a time-varying DC link voltage and a resulting motor torque and motor speed that also vary over time.

FIG. 3 illustrates a time-varying DC link voltage 302 and a resulting motor torque 306 and motor speed 310 that also vary over time. More specifically, FIG. 3 illustrates that a typical control algorithm cannot regulate steady state torque with a low capacitance capacitor, such as capacitor 114. In other words, a typical control algorithm that may be used in a motor assembly that includes a typical high capacitance capacitor (about several hundred µF) cannot regulate a constant torque when the typical high capacitance capacitor is removed. Graph 300 of the voltage 302 of DC link 117 vs. time illustrates that voltage 302 of DC link 117 reaches zero periodically because high capacitance capacitors (e.g., electrolytic capacitors) are not present to supply stored energy. More specifically, voltage 302 tends towards zero at twice the frequency of the AC input voltage provided by power supply 110. As shown in graph 304 of torque 306 versus time, if motor drive controller 100 implemented a typical control algorithm, torque 306 would vary in accordance with voltage 302 of DC link 117. As shown in graph 308 of motor speed 310 versus time, motor speed 310 would vary over time, in accordance with torque 306 and voltage 302 of DC link 117, if motor drive controller 100 implemented a typical control algorithm.

Figure 4:
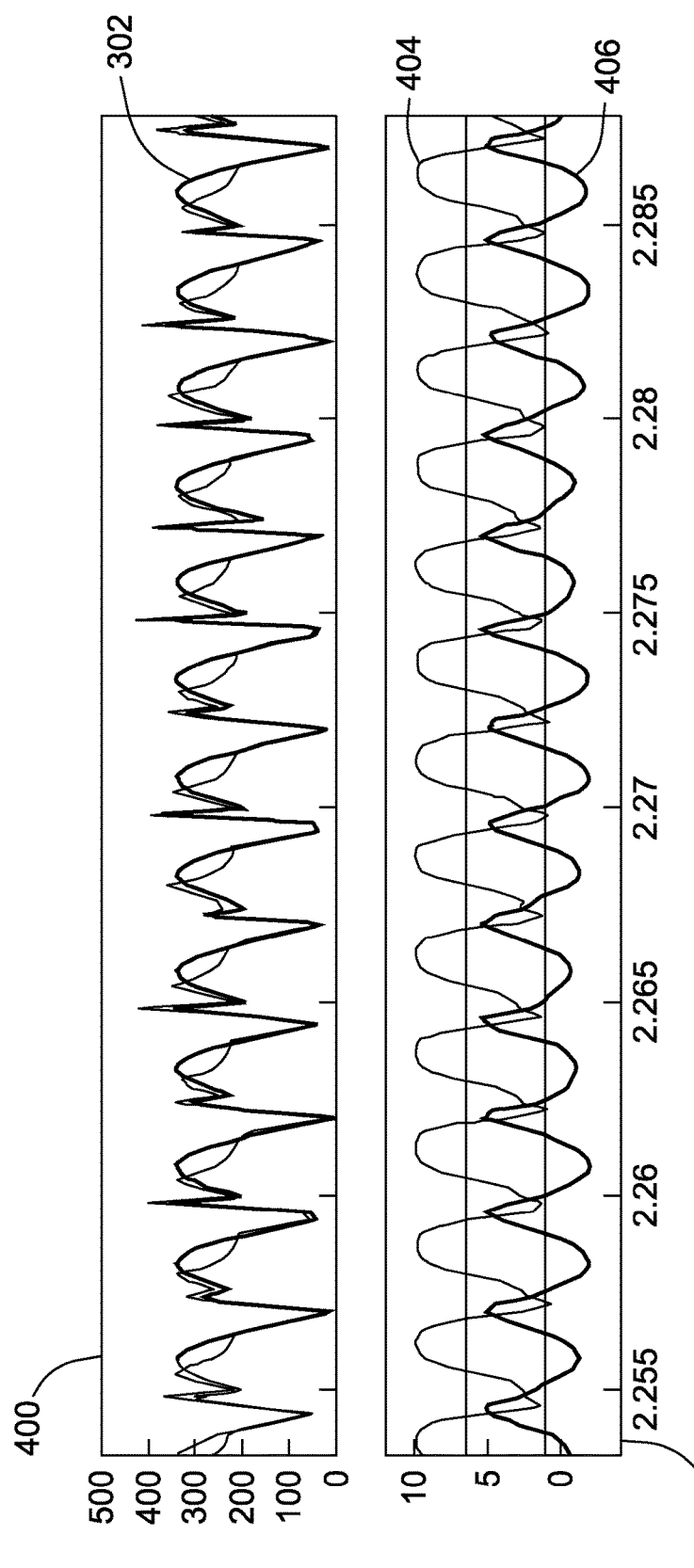
FIG. 4 illustrates a time-varying DC link voltage, a time-varying q-axis current component, and a time-varying d-axis current component.

FIG. 4 illustrates time-varying DC link voltage 302, a time-varying q-axis current component 404, and a time-varying d-axis current component 406. More specifically, FIG. 4 illustrates that a typical control algorithm cannot regulate to steady state for an electric motor with a low capacitance capacitor, such as capacitor 114, rather than a typical high capacitance capacitor. As described with reference to FIG. 3, voltage 302 of DC link 117 tends towards zero at twice the frequency of the AC input voltage provided by power supply 110. As shown in graphs 400 and 402, when a d-q transformation is performed on phase currents Ia, Ib, and Ic (FIG. 1), q-axis component 404, responsible for producing torque, and d-axis component 406, associated with flux, vary in accordance with voltage 302 of DC link 117. By controlling the magnitude of the d-axis component (the "flux component"), and the magnitude of the q-axis component (the "torque component"), the efficiency of electric motor 102 is increased. However, as described above, a typical control algorithm suited for use in a motor assembly that includes a typical high capacitance capacitor would be unable to regulate a constant torque component or a constant flux component to enhance efficiency and to control motor envelope.

Figure 5:
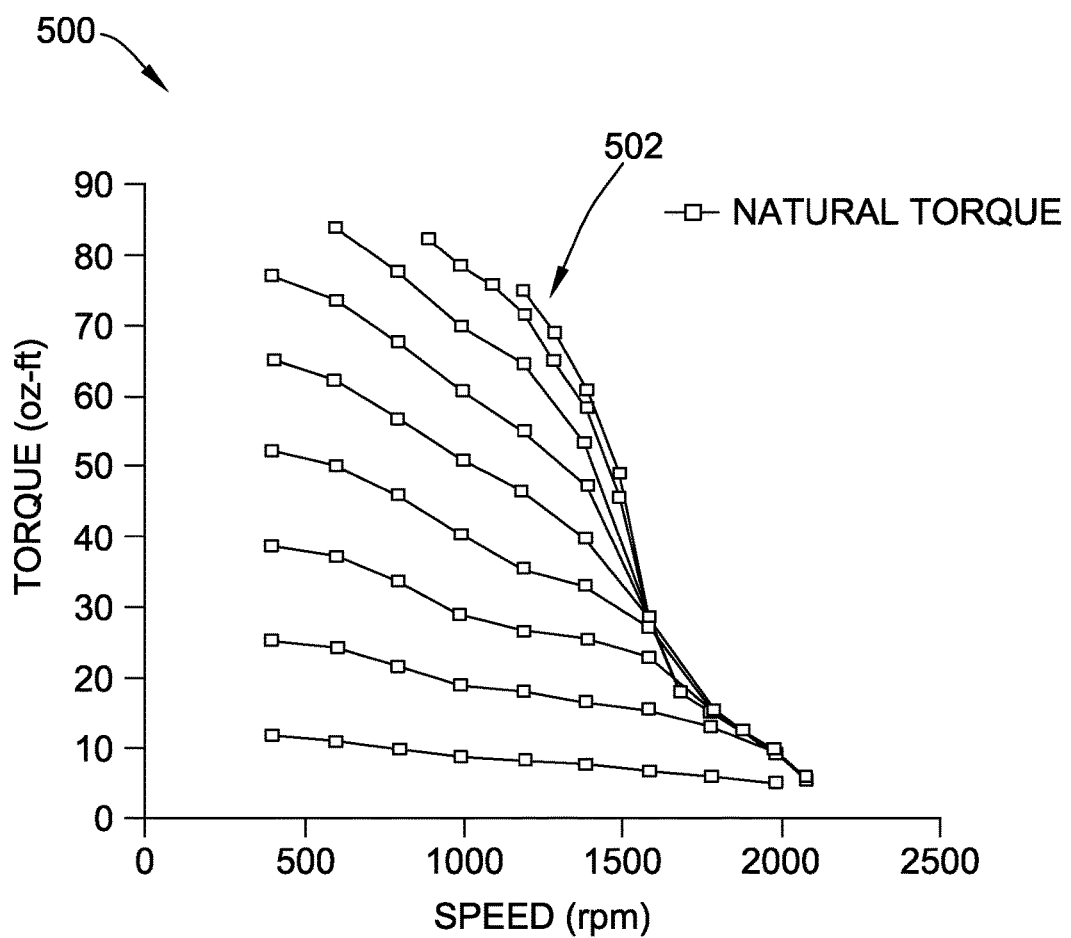
FIG. 5 is a graph of a natural torque profile of a low capacitance-controlled electric motor, using a typical motor control algorithm.

FIG. 5 is a graph 500 of a natural torque profile of a low capacitance-controlled motor, such as electric motor 102 (FIG. 1), using a typical motor control algorithm. Torque vs. speed curves 502 do not have linear segments, knees, and negative-slope portions similar to the linear segments 210, knees 212, and negative-slope portions 214 of traces 206 and 208 shown in FIG. 2. Rather, curves 502 indicate that torque decreases almost immediately as motor speed increases. Solutions for approximating the constant average torque characteristics shown in FIG. 2 using motor drive controller 100, which includes relatively low capacitance capacitor 114, are described herein. Moreover, solutions for enhancing efficiency of electric motor 102 using motor drive controller 100, and for controlling the machine operating envelope are described herein.

Figure 6:
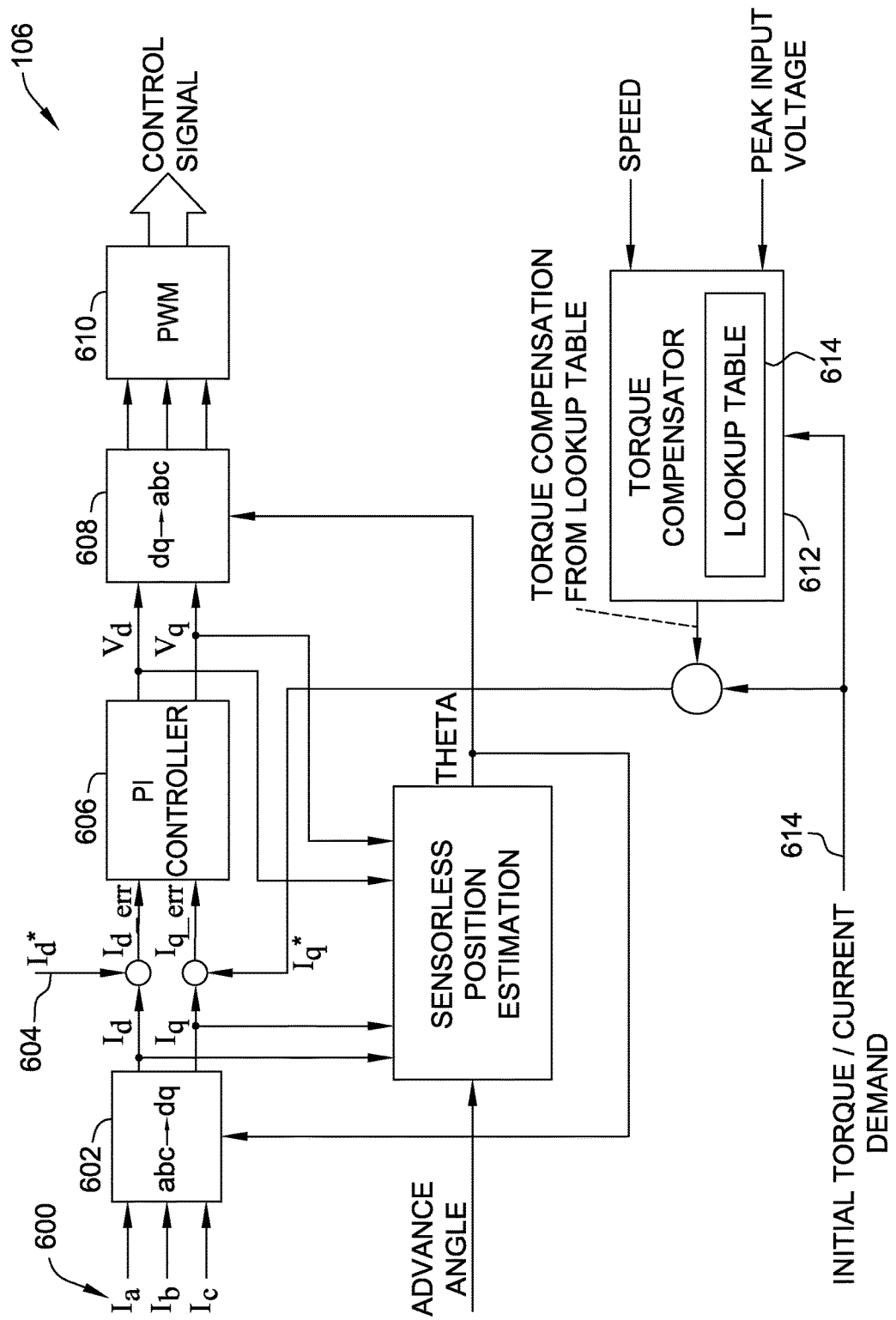
FIG. 6 is a block diagram of an exemplary algorithm implemented by the motor drive controller of FIG. 1.

FIG. 6 is a block diagram of an exemplary algorithm implemented by adjustment control module 106 (shown in FIG. 1). Because motor drive controller 100 (shown in FIG. 1), does not include a capacitor having a relatively high capacitance in a DC link circuit, voltage 302 (FIG. 3) of DC link 117 drops to zero each time the AC input voltage, provided by power supply 110, drops to approximately zero. Typically, when voltage 302 of DC link 117 drops to zero, also referred to as a 100% voltage ripple, regeneration and braking occur in electric motor 102, which may cause undesired effects in electric motor 102. For example, electric motor 102 may not operate with a constant average torque profile and the efficiency of electric motor 102 may not be constant. In the exemplary embodiment, controller 106 is configured to control electric motor 102 (shown in FIG. 1) to produce constant average torque during operation even when input voltage is one of approaching zero and equal to zero. As described herein, controller 106 is configured to control electric motor 102 to produce torque when voltage 302 of DC link 117 has a 100% voltage ripple.

Adjustment control module 106 is coupled to rectifier 104 and to inverter 108 (both shown in FIG. 1). Adjustment control module 106 receives at least one of three-phase motor current measurements $I_a$, $I_b$, and $I_c$ from at least one current sensor 600, which is coupled to electric motor 102. In the embodiment shown in FIG. 6, adjustment control module 106 includes a d-q conversion module 602, a current command generator 604, a PI controller 606, an a-b-c conversion module 608, a modulator 610, and a torque compensator 612.

Current measurements $I_a$, $I_b$, and $I_c$ are converted to a d-q reference frame by d-q conversion module 602 to obtain a d-axis current $I_d$, related to a flux linkage component ("flux component") of the current and a q-axis current $I_q$ related to a torque component of the current. $I_d$ and $I_q$ are transmitted to PI controller 606. Current command generator 604 generates a d-axis command, $I_d^*$ (also referred to herein as a "flux component demand value"). Torque compensator 612 generates a q-axis command $I_q^*$ using a real time current demand signal 614 (also referred to herein as a "torque component demand value"). D-axis command $I_d^*$ and q-axis command $I_q^*$ are both also sent to PI controller 606.

In one embodiment, torque compensator 612 is based on a lookup table 614 to regulate constant average torque. The lookup table includes values based on a function of an input voltage (e.g., AC input voltage provided by power supply 110, voltage 302 of DC link 117, and/or peak input voltage), torque component demand value 614, and a current operating speed of electric motor 102. Accordingly, lookup table 614 is a three dimensional lookup table, however any number of dimensions may be used to accommodate additional or less parameters on which to base the constant average torque algorithm. In various embodiments, lookup table 614 is calculated offline, taking into account the parameters of electric motor 102, such as resistance, inductance, back EMF and torque constants. Torque compensator 612 uses the motor speed as an input to "read" lookup table 614. The motor speed may be a transient speed or a filtered version of the motor speed that averages speed oscillations. To determine an amount of available voltage, and because voltage 302 of DC link 117 could be oscillating between a peak full wave rectified voltage and zero, adjustment control module 106 performs an algorithm that tracks a peak of voltage 302 of DC link 117 at one or more multiples of the period of the AC source signal (e.g., the AC input voltage provided by power supply 110). For example, in the United States, for 60 Hz, adjustment control module 106 tracks voltage 302 of DC link 117 within 30 Hz, 60 Hz, or 120 Hz, to determine the peak value of voltage 302. In an alternative embodiment, motor drive controller 100 senses the AC input voltage provided by power supply 100 and adjustment control module 106 implements a similar tracking algorithm to determine the peak value of the AC input voltage.

Example values in lookup table 614 for a given input voltage may be given by:

| | Peak Voltage = 240 Vrms = 340 Vdc | | | | | | | | | | | | |
|---|---|---|---|---|---|---|---|---|---|---|---|---|---|
| | Speed (RPM) | | | | | | | | | | | | |
| Torque/Current | 100 | 200 | 300 | 400 | 500 | 600 | 700 | 800 | 900 | 1000 | 1100 | 1200 | 1300 |
| 10% | 1% | 3% | 6% | 9% | 14% | 16% | 19% | 23% | 26% | 28% | 32% | 35% | 37% |
| 20% | 2% | 4% | 7% | 10% | 15% | 17% | 20% | 24% | 27% | 29% | 33% | 36% | 38% |
| 30% | 3% | 5% | 8% | 11% | 16% | 18% | 21% | 25% | 28% | 30% | 34% | 37% | 39% |
| 40% | 4% | 6% | 9% | 12% | 17% | 19% | 22% | 26% | 29% | 31% | 35% | 38% | 40% |
| 50% | 6% | 8% | 11% | 14% | 19% | 21% | 24% | 28% | 31% | 33% | 37% | 40% | 42% |
| 60% | 8% | 10% | 13% | 16% | 21% | 23% | 26% | 30% | 33% | 35% | 39% | 42% | 44% |
| 70% | 10% | 12% | 15% | 18% | 23% | 25% | 28% | 32% | 35% | 37% | 41% | 44% | 46% |
| 80% | 12% | 14% | 17% | 20% | 25% | 27% | 30% | 34% | 37% | 39% | 43% | 46% | 48% |
| 90% | 13% | 15% | 18% | 21% | 26% | 28% | 31% | 35% | 38% | 40% | 44% | 47% | 49% |
| 100% | 14% | 16% | 19% | 22% | 27% | 29% | 32% | 36% | 39% | 41% | 45% | 48% | 50% |

As described above, lookup table 614 may be generated offline. In other embodiments, lookup table 614 may be computed by a microcontroller (not shown) included in motor drive controller 100 by solving circuit equations. However such an operation may be complex and resource intensive. Moreover, in using lookup table 614 and generating q-axis command $I_q^*$, motor drive controller 100 does not require data pertaining to rotor positions. However, in some embodiments, in carrying out the functions described above, motor drive controller 100 may additionally receive data pertaining to rotor positions from one or more sensors, or through mathematical models.

PI controller 606 prepares voltage values $V_d$ and $V_q$ to be applied to electric motor 102 such that the d-axis current value $I_d$ and the q-axis current value $I_q$ are regulated. $V_d$ and $V_q$ are converted back to a three-phase coordinate system by a-b-c conversion module 608, which provides the three-phase voltage values $V_a$, $V_b$, and $V_c$ to modulator 610. Modulator 610 outputs the voltage values $V_a$, $V_b$, and $V_c$ to inverter 108 as a pulse-width-modulated (PWM) signal.

Adjustment control module 106 may be configured to control electric motor 102 to produce constant average torque during all operations of motor 102 and when input voltage is one of approaching zero and equal to zero. More specifically, adjustment control module 106 may be configured to control current flowing to electric motor 102 such that electric motor 102 produces torque when input voltage is one of approaching zero and equal to zero. However, as described herein, adjustment control module 106 may alternatively be configured to prioritize regulating an average flux component value over maintaining a constant average torque, in order to enhance efficiency of electric motor 102, as described herein.

In one embodiment, to control current flowing to electric motor 102, adjustment control module 106 is configured to induce the flux component $I_d$ of the current and maintain the torque component $I_q$ of the current above zero while reducing loss of energy stored in stator windings (not shown) of electric motor 102. In another embodiment, to control current flowing to electric motor 102, adjustment control module 106 is configured to induce the flux component $I_d$ of the current and maintain the torque component $I_q$ of the current above zero while reducing torque ripple in electric motor 102. In yet another embodiment, to control current flowing to electric motor 102, adjustment control module 106 is configured to induce the flux component $I_d$ of the current and maintain the torque component $I_q$ of the current above zero while manipulating torque harmonics to reduce audible noise in electric motor 102.

In some embodiments, adjustment control module 106 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, d-q conversion module 602, current command generator 604, PI controller 606, a-b-c conversion module 608, modulator 610, and torque compensator 612 are constructed of software and/or firmware embedded in one or more processing devices. In this manner, adjustment control module 106 is programmable, such that instructions, intervals, thresholds, and/or ranges, etc. may be programmed for a particular electric motor 102 and/or operator of electric motor 102. One or more of d-q conversion module 602, current command generator 604, PI controller 606, a-b-c conversion module 608, modulator 610, and torque compensator 612 may be wholly or partially provided by discrete components, external to one or more processing devices.

Figure 7:
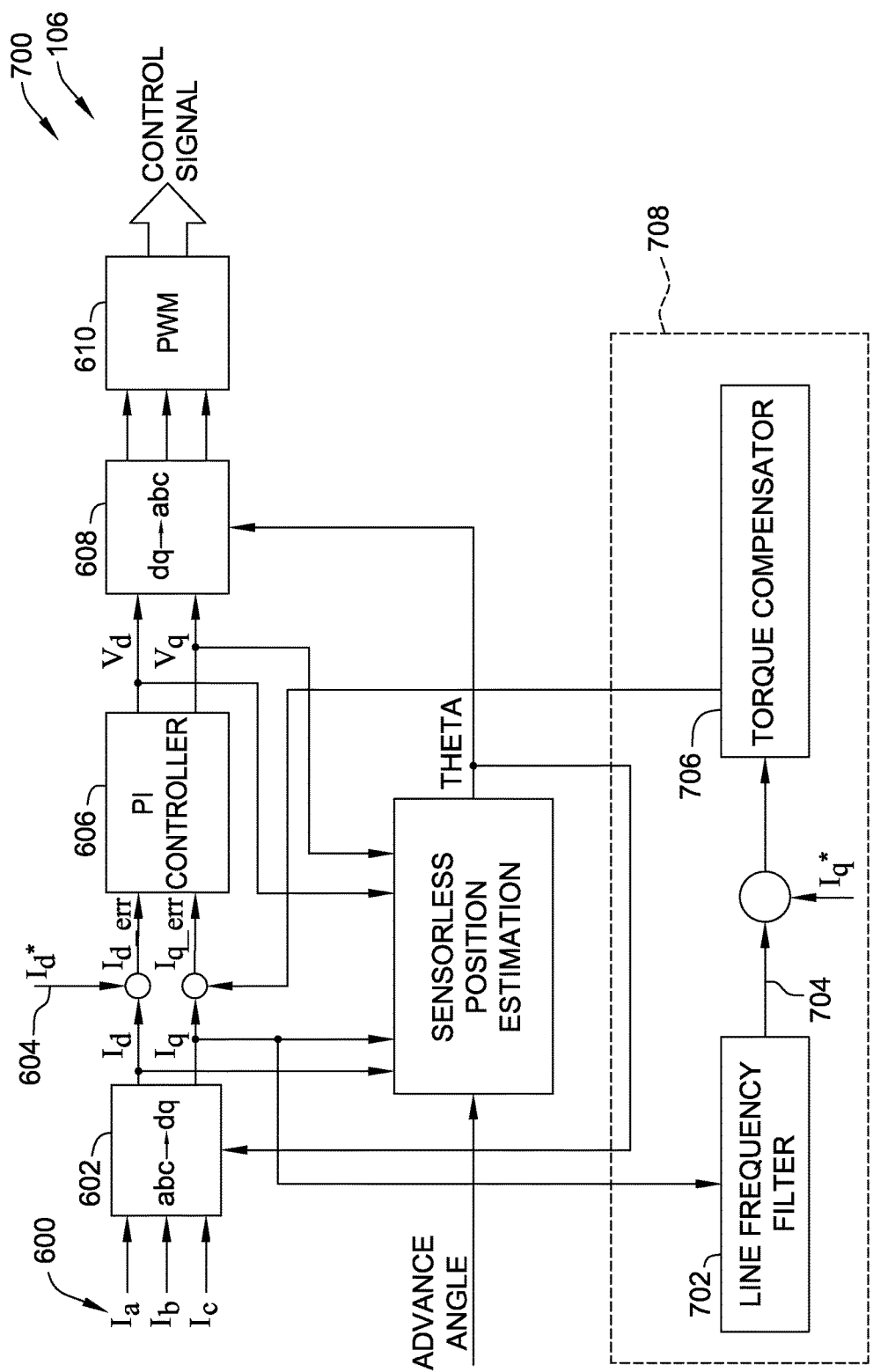
FIG. 7 is a block diagram of another exemplary algorithm implemented by the motor drive controller of FIG. 1.

FIG. 7 is a block diagram of another algorithm 700 that may be implemented by adjustment control module 106 (shown in FIG. 1) to maintain a constant average torque output of electric motor 102 (also shown in FIG. 1). In this embodiment, instead of using torque compensator 612 that includes lookup table 614 (FIG. 6), adjustment control module 106 includes a line frequency filter 702 that filters the $I_q$ signal. Adjustment control module 106 then combines the filtered $I_q$ signal 704 with q-axis command $I_q^*$ ("torque demand value" or "torque component demand value") and provides the filtered $I_q$ signal and $I_q^*$ to real time torque compensator 706. More specifically, motor drive controller 100 estimates an instantaneous torque of electric motor 102 by sensing or measuring an instantaneous current provided to electric motor 102, and line frequency filter 702 filters the instantaneous torque to provide an average torque of electric motor 102. External additional control loop 708, including real time torque compensator 706 generates, in real time, an adjusted torque demand value to cause controller 106 to provide a constant average torque.

Figure 8:
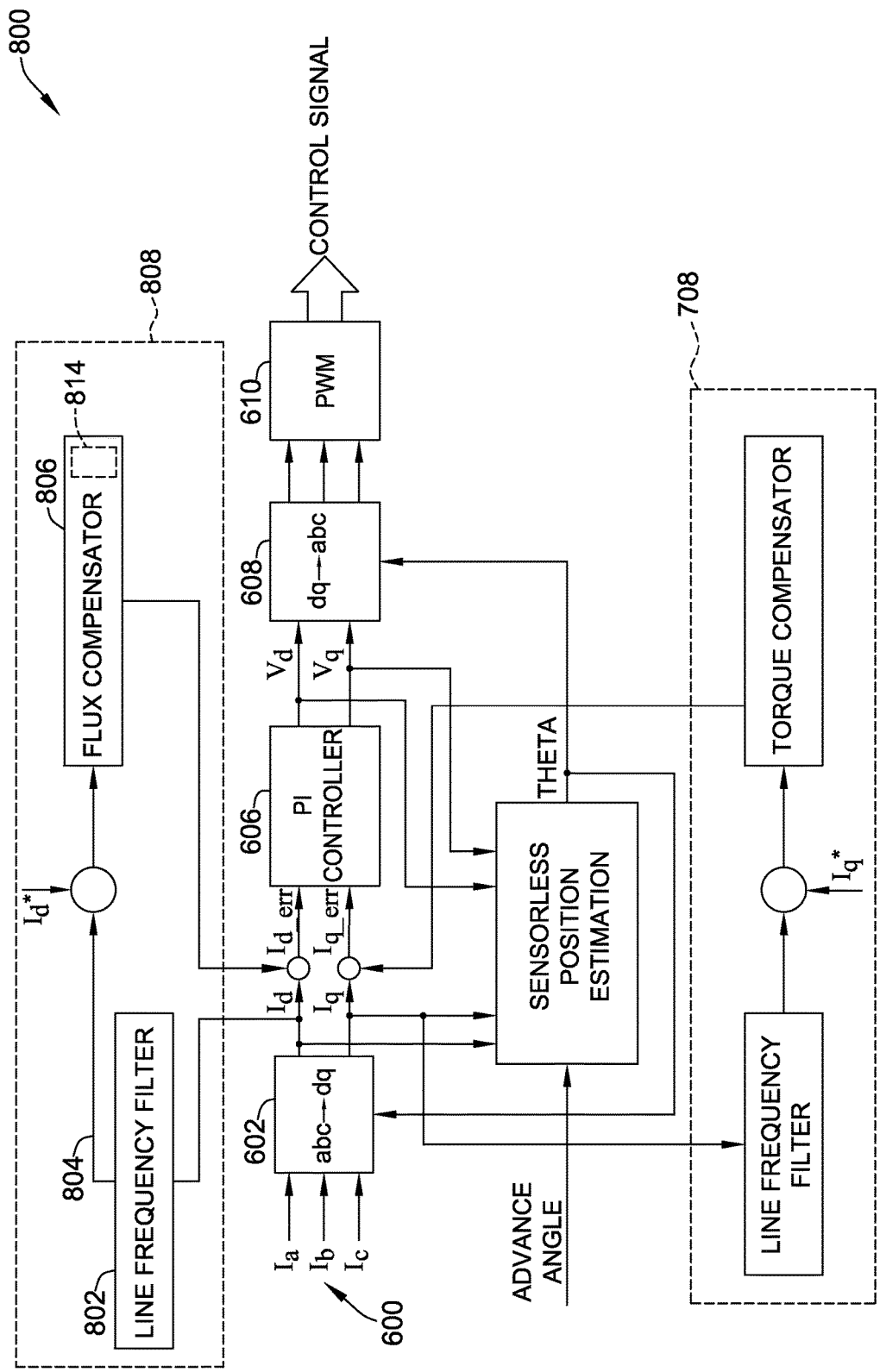
FIG. 8 is a block diagram of another exemplary algorithm implemented by the motor drive controller of FIG. 1.

FIG. 8 is a block diagram of another algorithm 800 that may be implemented by adjustment control module 106 (shown in FIG. 1) to enhance the efficiency of electric motor 102 (also shown in FIG. 1). Algorithm 800 is similar to algorithm 700 (FIG. 7), and includes line frequency filter 702, filtered $I_q$ signal 704, and torque compensator 706 in control loop 708. Additionally, algorithm 800 includes a line frequency filter 802, a filtered $I_d$ signal 804, and a flux compensator 806 in a control loop 808. More specifically, line frequency filter 802 filters the instantaneous $I_d$ signal ("flux component value" or "instantaneous flux component value") to generate filtered $I_d$ signal 804 ("average flux component value"). Adjustment control module 106 then combines filtered $I_d$ signal 804 ("average flux component value") with d-axis command $I_d^*$ ("flux component demand value") from current command generator 604 and provides the filtered $I_d$ signal and $I_d^*$ to real time flux compensator 806. Control loop 808, including real time flux compensator 806 generates, in real time, an adjusted flux demand value to cause adjustment control module 106 to enhance the efficiency of electric motor 102 in accordance with the flux component demand value, $I_d^*$. In some embodiments, the closer the average flux component value is to zero, the more efficient electric motor 102 will be. In some embodiments, flux compensator 806 operates similarly to torque compensator 612 and includes a lookup table 814 similar to lookup table 614, associating an adjusted flux demand value with an input voltage (e.g., AC input voltage provided by power supply 110, voltage 302 of DC link 117, and/or peak input voltage), a flux component demand value, and a current speed of electric motor 102. In such embodiments, line frequency filter 802 may be absent.

Figure 9:
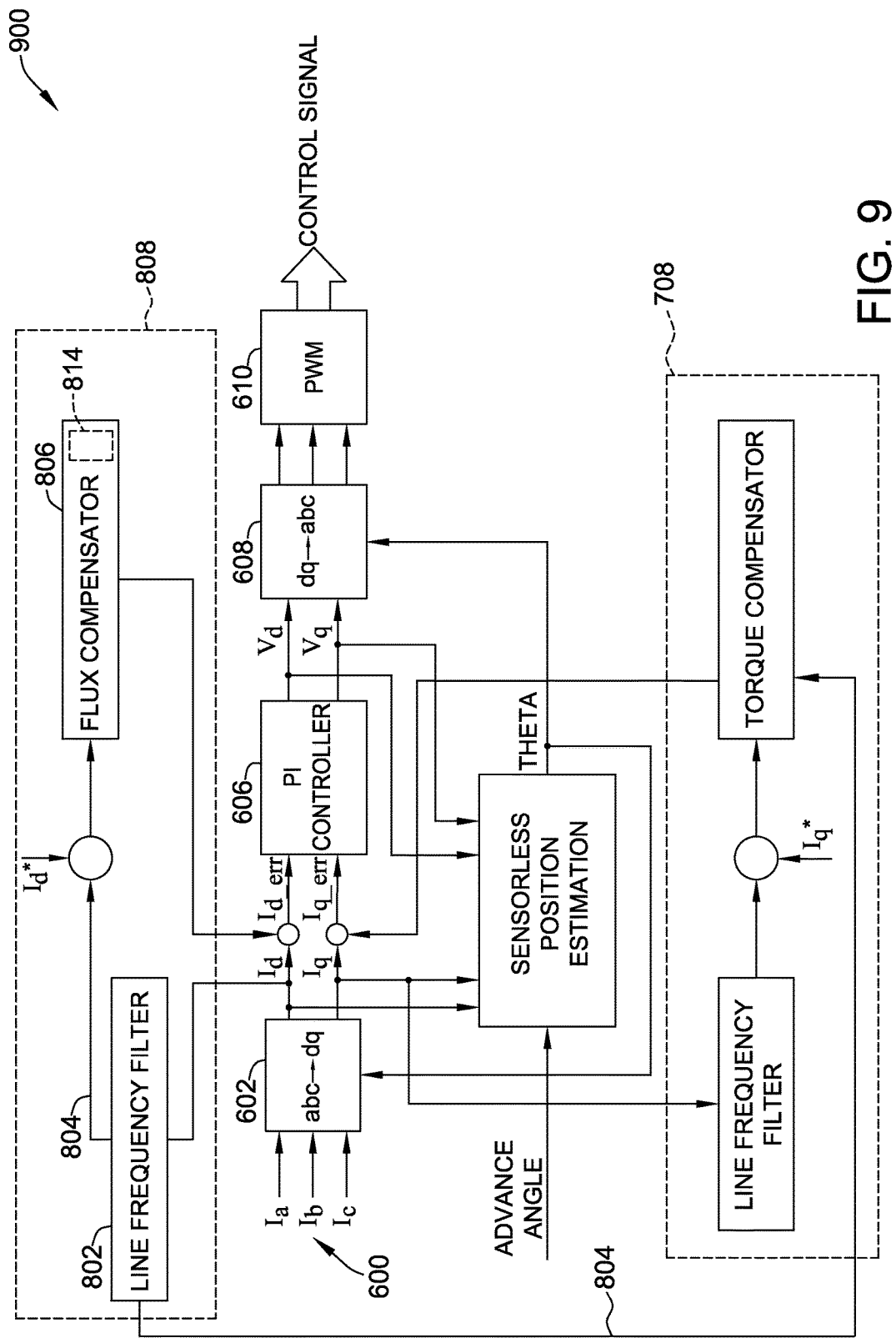
FIG. 9 is a block diagram of another exemplary algorithm implemented by the motor drive controller of FIG. 1.

FIG. 9 is a block diagram of another algorithm 900 that may be implemented by adjustment control module 106 (shown in FIG. 1). Algorithm 900 is similar to algorithms 800 and 900, with the addition of providing average flux component value 804 to torque compensator 706. Accordingly, torque compensator 906, which otherwise operates similarly to torque compensator 706, scales down or reduces the torque component demand value when available input voltage is such that average flux component value 804 (i.e., the average efficiency of electric motor 102) cannot be maintained at or within a predetermined range of the flux component demand value. In other words, algorithm 900 causes adjustment control module 106 to prioritize maintaining a constant average flux of electric motor 102 over maintaining a constant average torque of electric motor 102. Accordingly, by implementing algorithm 900, motor drive controller 100 and more specifically, adjustment control module 106, performs accurate envelope control for electric motor 102.

Figure 10:
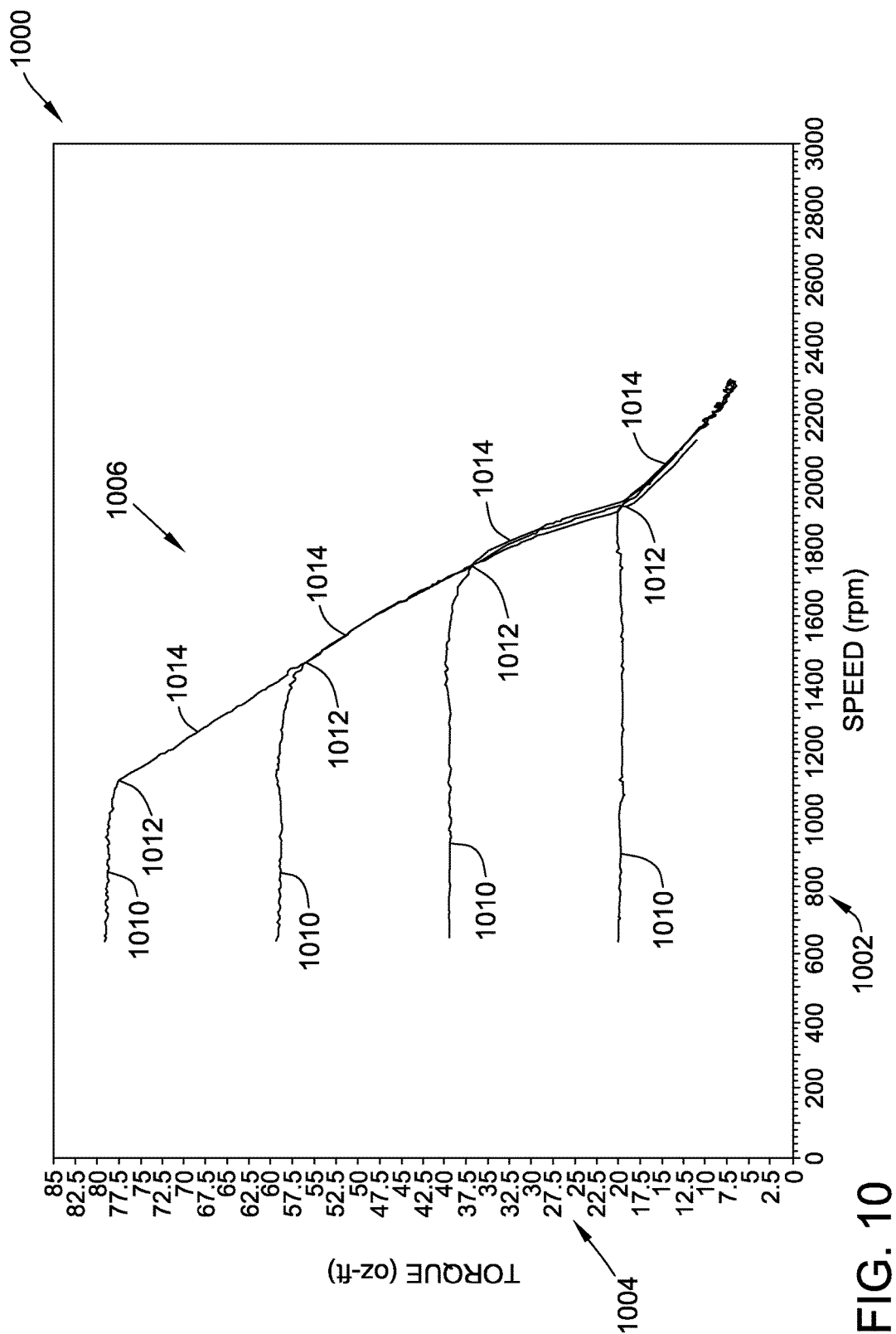
FIG. 10 is a graph of torque versus speed for the electric motor of FIG. 1 when controlled by the motor drive controller of FIG. 1 in accordance with the algorithms described above.

FIG. 10 is a graph 1000 of torque, measured in oz-ft versus speed, measured in rotations per minute (RPM) for electric motor 102 when controlled by motor drive controller 100 using the algorithms described above. More specifically, graph 1000 includes an x-axis 1002 representing the speed of electric motor 102 and a y-axis 1004 representing the torque of electric motor 102. A family of traces 1006 include linear segments 1010, similar to linear segments 210 (FIG. 2), knees 1012, similar to knees 212 (FIG. 2), and negative slope portions 1014, similar to negative slope portions 214 (FIG. 2). In other words, by implementing control algorithms described herein, for example algorithm 900, motor drive controller 100 controls an envelope of electric motor 102 such that electric motor 102 maintains an average torque and enhances efficiency without requiring a bulky electrolytic capacity having comparatively higher capacitance than capacitor 114 (FIG. 1).

Figure 11:
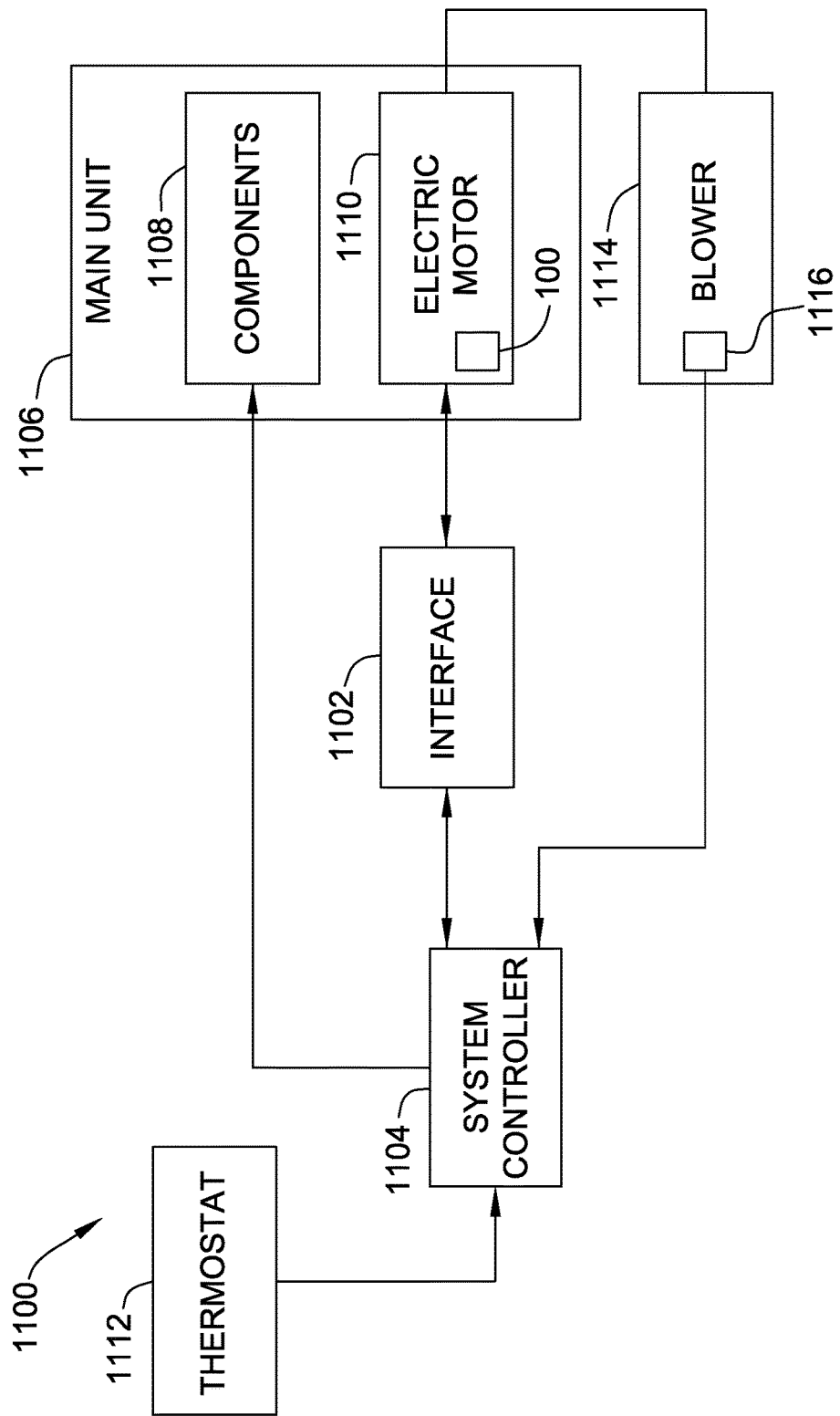
FIG. 11 is a block diagram of an exemplary embodiment of the motor drive controller shown in FIG. 1 in an air moving control system.

FIG. 11 is a block diagram of an exemplary embodiment of motor drive controller 100 shown in FIG. 1 in an air moving control system 1100. System 1100 is an air moving system, such as a residential heating, ventilation and air conditioning (HVAC) system, a light industrial HVAC system, or a clean room filtering system. While described herein as being used in an HVAC system, motor drive controller 100 may be used in other applications, including, but not limited to, swimming pool pumps, laundry machine motors, and gas pre-mix motors. System 1100 includes an interface circuit 1102 electrically coupled to a system controller 1104, for example a HVAC system controller, and a main unit 1106, for example a HVAC unit. Main unit 1106 includes components 1108 and electric motor 1110. In one embodiment, electric motor 1110 is a motor configured to rotate a blower 1114. Electric motor 1110 includes motor drive controller 100. In one embodiment, system controller 1104 is connected to a thermostat 1112. Thermostat 1112 includes a plurality of settings, or modes, such as low heat, high heat, cooling, dehumidify, and continuous fan. Additionally, thermostat 1112 measures a temperature in a predetermined space or location and transmits an electrical signal representing the measured temperature to system controller 1104.

System controller 1104 controls main unit 1106 via interface circuit 1102. Interface circuit 1102 receives control signals in the form of input voltage signals from system controller 1104 and translates the signals to signals suitable for controlling electric motor 1110. Typically, circuits within system 1100 operate at a different voltage level than does electric motor 1110. Therefore, interface circuit 1102 is utilized for communications between system controller 1104 and electric motor 1110. Such interfaces typically control electric motors using pulse width modulation (PWM) to adjust a speed of electric motor 1110.

The translated signals are transmitted to motor drive controller 100 of electric motor 1110, and a torque of electric motor 1110 is varied in accordance with the adjusted voltage outputs. Electric motor 1110 is mechanically connected to blower 1114. In one embodiment, blower 1114 includes a detection module 1116 which provides signals, for example signals indicative of a speed of rotation of blower 1114, to system controller 1104. Electric motor 1110 may be similar to electric motor 102 (FIG. 1) and blower 1110 may be similar to load 112 (FIG. 1).

Figure 12:
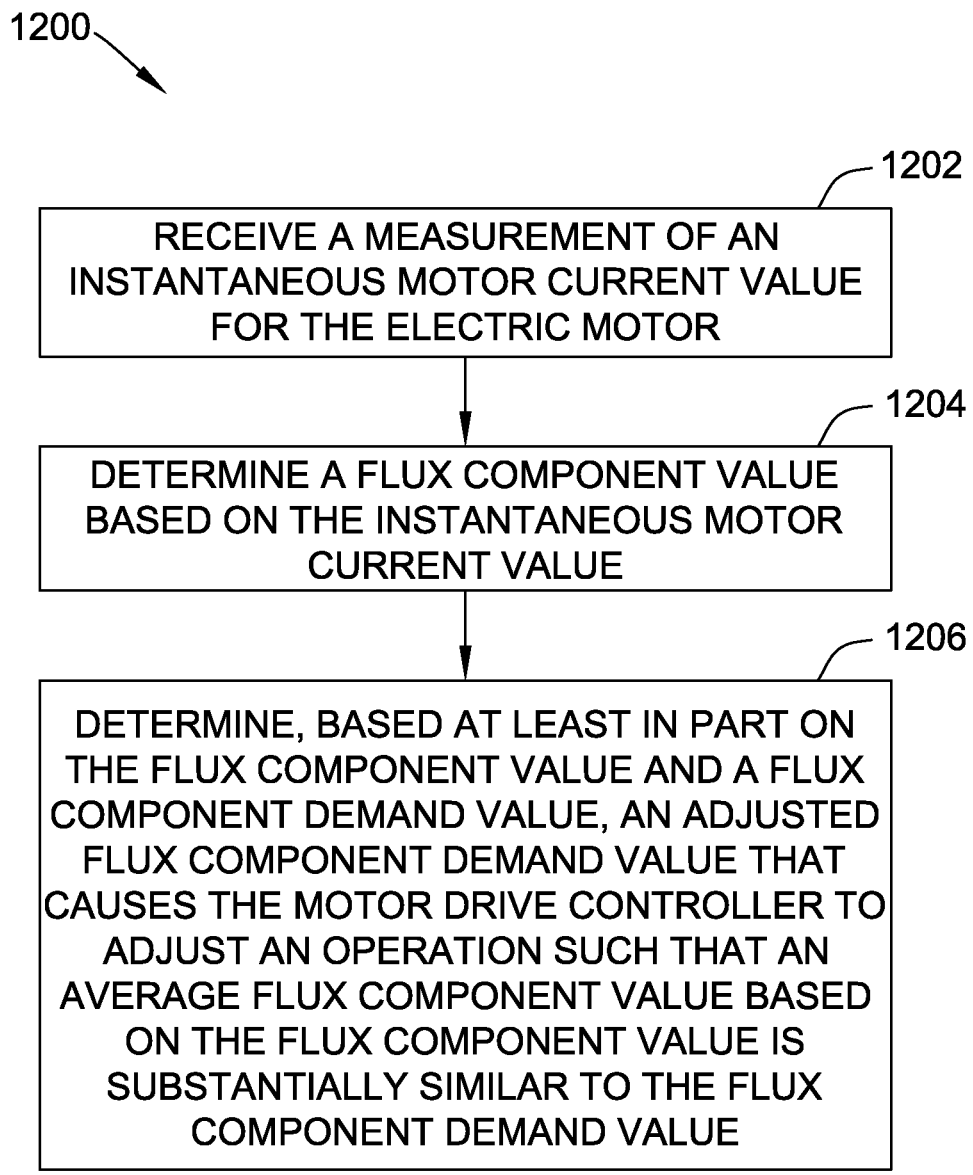
FIG. 12 is a flow chart of a method of controlling an electric motor, such as the electric motor shown in FIG. 1, using the motor drive controller shown in FIG. 1.

FIG. 12 is a flow chart 1200 of a method of controlling an electric motor, such as electric motor 102 (shown in FIG. 1) using motor drive controller 100 (shown in FIG. 1). In the exemplary embodiment, electric motor 102 is coupled to a load 112 (shown in FIG. 1) and to a power supply, such as power supply 110 (shown in FIG. 1).

In the exemplary embodiment, motor drive controller 100, and more specifically, adjustment control module 106 (FIG. 1) receives 1202 a measurement of an instantaneous motor current value in electric motor 102. The amount of current is measured by at least one current sensor 600 (shown in FIG. 6) coupled to electric motor 102 and to motor drive controller 100. Additionally, adjustment control module 106 determines 1204 a flux component value based on the instantaneous motor current value. Additionally, adjustment control module 106 determines 1206, based at least in part on the flux component value and a flux component demand value (e.g., $I_d^*$) an adjusted flux component demand value that causes motor drive controller 100 to adjust an operation such that an average flux component value is substantially similar to the flux component demand value. More specifically, motor drive controller 100 may adjust an operation by causing PI controller 606 (FIG. 6) to prepare a voltage value $V_d$ to be applied to electric motor 102, such that the average flux component value is equal to or substantially equal to the flux component demand value.

In some embodiments, motor drive controller 100 additionally determines an instantaneous torque component value based on the instantaneous motor current value, generates an average torque component value based on the instantaneous torque component value, for example by filtering the instantaneous torque component value using line frequency filter 702 (FIG. 7), and determines, based on the average torque component value and a torque component demand value (e.g., $I_q^*$), an adjusted torque component demand value that causes motor drive controller 100 to adjust operation such that the average torque component value is substantially similar to the torque component demand value. More specifically, motor drive controller 100 may adjust the operation by causing PI controller 606 (FIG. 6) to prepare a voltage value $V_q$ to be applied to electric motor 102, such that the average torque component value is equal to or substantially equal to the torque component demand value.

In some embodiments, adjustment control module 106 additionally determines the adjusted flux component demand value such that the average flux component value is equal to, or substantially equal to, zero, or any other value that enhances efficiency. In some embodiments, adjustment control module 106 additionally determines the adjusted flux component demand value based on a lookup table (e.g., lookup table 814) that relates the adjusted flux component value to at least one of a speed of electric motor 102 and an input voltage (e.g., an AC input voltage provided by power supply 110). In some embodiments, the flux component value referred to above is an instantaneous flux component value and adjustment control module 106 determines the average flux component value by filtering (e.g., averaging) the instantaneous flux component value, for example using line frequency filter 802. In example embodiments, adjustment control module 106 determines the adjusted flux component demand value in real time.

In some embodiments, adjustment control module 106 prioritizes the adjusted flux component demand value over the adjusted torque component demand value. Additionally, in some embodiments, adjustment control module 106 determines, based at least on an input voltage, for example the AC input voltage provided by power supply 110, that the flux component demand value cannot be approximated within a predetermined range and adjustment control module 106 reduces the adjusted torque component demand value, thereby reducing the torque of electric motor 102 to enhance efficiency and provide accurate control of the electric motor 102.

Embodiments of the systems and methods described herein enable a manufacturer to produce a motor drive controller for an electric motor without including a typical high capacitance capacitor, while maintaining an ability of the motor drive controller to regulate an average torque, enhance efficiency, and control envelope of the electric motor. Accordingly, manufacturers may produce less expensive and less bulky motor drive controllers compared to typical motor drive controllers.

A technical effect of the methods and systems described herein may include one or more of: (a) receiving a measurement of an instantaneous motor current value for an electric motor; (b) determining a flux component value based on the instantaneous motor current value; (c) determining, based at least in part on the flux component value and a flux component demand value, an adjusted flux component demand value that causes a motor drive controller to adjust an operation such that an average flux component value based on the flux component value is substantially similar to the flux component demand value; (d) determining an instantaneous torque component value based on the instantaneous motor current value; (e) generating an average torque component value based on the instantaneous torque component value; (f) determining, based on the average torque component value and a torque component demand value, an adjusted torque component demand value that causes the motor drive controller to adjust the operation such that the average torque component value is substantially similar to the torque component demand value; and (g) prioritizing the adjusted flux component demand value over the adjusted torque component demand value.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric motor drive controller configured to be coupled to an electric motor, said electric motor drive controller comprising:
   a rectifier configured to convert an AC input voltage having a frequency to a DC voltage, wherein the DC voltage tends towards zero at about twice the frequency of the AC input voltage;
   a DC link electrically coupled to said rectifier;
   an inverter electrically coupled to said DC link and configured to generate a three phase pulse width modulated (PWM) voltage to drive the electric motor; and
   an adjustment control module configured to:
     receive a measurement of an instantaneous motor current value from a current sensor coupled to the electric motor at one or more multiples of the frequency of the AC input voltage;
     determine a flux component value based on the measurement of the instantaneous motor current value at one or more multiples of the frequency of the AC input voltage;
     determine an average flux component value by filtering the flux component value at one or more multiples of the frequency of the AC input voltage;
     receive a flux component demand value from a current command generator;
     determine an adjusted flux component demand value at one or more multiples of the frequency of the AC input voltage based on the determined average flux component value and the received flux component demand value, wherein the adjusted flux component demand value causes said motor drive controller to adjust an operation such that a difference between the average flux component value and the flux component demand value is within a first predetermined threshold; and
     reduce, by a torque compensator, a torque component demand value as the DC voltage tends towards zero to enable the adjusted flux component demand value to maintain the difference between the average flux component value and the flux component demand value within the first predetermined threshold, the DC voltage measured by a voltage sensor coupled to an output of said rectifier.

2. The electric motor drive controller of claim 1, wherein said adjustment control module is further configured to:
   determine an instantaneous torque component value based on the instantaneous motor current value at one or more multiples of the frequency of the AC input voltage;

generate an average torque component value based on the instantaneous torque component value at one or more multiples of the frequency of the AC input voltage; and determine an adjusted torque component demand value at one or more multiples of the frequency of the AC input voltage such that the adjusted torque component demand value causes the motor drive controller to adjust the operation such that the difference between the average torque component value and the torque component demand value is within a second predetermined threshold.

3. The electric motor drive controller of claim 2, wherein said adjustment control module is configured to prioritize the adjusted flux component demand value over the adjusted torque component demand value.

4. The electric motor drive controller of claim 2, wherein said adjustment control module is configured to:
determine whether the torque component demand value must be reduced to maintain that the difference between the average flux component value and the flux component demand value is within the first predetermined threshold; and
reduce the adjusted torque component demand value in response to determining that the torque component demand value must be reduced.

5. The electric motor drive controller of claim 1, wherein said adjustment control module is further configured to determine the adjusted flux component demand value such that the difference between the average flux component value and zero is within the first predetermined threshold.

6. The electric motor drive controller of claim 1, wherein said adjustment control module is further configured to determine the adjusted flux component demand value based on a lookup table that relates the adjusted flux component demand value to at least one of a speed of the electric motor and the AC input voltage.

7. The electric motor drive controller of claim 1, wherein said adjustment control module is configured to determine the adjusted flux component demand value in real time.

8. A method of controlling an electric motor using a motor drive controller that includes an adjustment control module that includes a current command generator, the electric motor configured to be coupled to a power supply and to a load, the power supply providing an AC input voltage having a frequency and a DC voltage generated from the AC input voltage by a rectifier tends towards zero at about twice the frequency of the AC input voltage, said method comprising:
receiving a measurement of an instantaneous motor current value from a current sensor coupled to the electric motor at one or more multiples of the frequency of the AC input voltage;
determining a flux component value based on the measurement of the instantaneous motor current value at one or more multiples of the frequency of the AC input voltage;
determining an average flux component value by filtering the flux component value at one or more multiples of the frequency of the AC input voltage;
receiving a flux component demand value from a current command generator;
determining an adjusted flux component demand value at one or more multiples of the frequency of the AC input voltage based on the determined average flux component value and the received flux component demand value, wherein the adjusted flux component demand value causes the motor drive controller to adjust an operation such that the difference between the average flux component value and the flux component demand value is within a first predetermined threshold; and reducing, by a torque compensator a torque component demand value as the DC voltage tends towards zero to enable the adjusted flux component demand value to maintain the difference between the average flux component value and the flux component demand value within the first predetermined threshold, the DC voltage measured by a voltage sensor coupled to an output of the rectifier.

9. The method of claim 8, further comprising:
determining an instantaneous torque component value based on the instantaneous motor current value;
generating an average torque component value based on the instantaneous torque component value; and
determining, based on the average torque component value and a torque component demand value, an adjusted torque component demand value at one or more multiples of the frequency of the AC input voltage such that the adjusted torque component demand value causes the motor drive controller to adjust the operation such that the difference between the average torque component value and the torque component demand value is within a second predetermined threshold.

10. The method of claim 9, further comprising prioritizing the adjusted flux component demand value over the adjusted torque component demand value.

11. The method of claim 9, further comprising:
determining whether the torque component demand value must be reduced to maintain that the difference between the average flux component value and the flux component demand value is within the first predetermined threshold; and
reducing the adjusted torque component demand value in response to determining that the torque component demand value must be reduced.

12. The method of claim 8, further comprising determining the adjusted flux component demand value such that the difference between the average flux component value and zero is within the first predetermined threshold.

13. The method of claim 8, further comprising determining the adjusted flux component demand value based on a lookup table that relates the adjusted flux component demand value to at least one of a speed of the electric motor and an input voltage.

14. The method of claim 8, further comprising determining the adjusted flux component demand value in real time.

15. An air moving system comprising:
an electric motor;
a load coupled to said electric motor; and
a motor drive controller coupled to said electric motor, wherein a DC voltage generated by a rectifier from an AC input voltage provided to said electric motor tends towards zero at about twice a frequency of the AC input voltage, said motor drive controller including an adjustment control module that includes a current command generator, said adjustment control module configured to:
receive a measurement of an instantaneous motor current value from a current sensor coupled to the electric motor at one or more multiples of the frequency of the AC input voltage;

determine a flux component value based on the measurement of instantaneous motor current value at one or more multiples of the frequency of the AC input voltage;

determine an average flux component value by filtering the flux component value at one or more multiples of the frequency of the AC input voltage;

receive a flux component demand value from a current command generator;

determine an adjusted torque component demand value at one or more multiples of the frequency of the AC input voltage based on the determined average flux component value and the received flux component demand value, wherein the adjusted flux component demand value causes said motor drive controller to adjust an operation such that the difference between the average flux component value and the flux component demand value is within a first predetermined threshold; and reduce, by a torque compensator, a torque component demand value as the DC voltage tends towards zero to enable the adjusted flux component demand value to maintain the difference between the average flux component value and the flux component demand value within the first predetermined threshold, the DC voltage measured by a voltage sensor coupled to an output of the rectifier.

16. The system of claim 15, wherein said adjustment control module is further configured to:

determine an instantaneous torque component value based on the instantaneous motor current value;

generate an average torque component value based on the instantaneous torque component value; and determine, based on the average torque component value and a torque component demand value, an adjusted torque component demand value at one or more multiples of the frequency of the AC input voltage such that the adjusted torque component demand value causes the motor drive controller to adjust the operation such that the difference between the average torque component value and the torque component demand value is within a second predetermined threshold.

17. The system of claim 16, wherein said adjustment control module is further configured to:

determine whether the torque component demand value must be reduced to maintain that the difference between the average flux component value and the flux component demand value is within the first predetermined threshold; and reduce the adjusted torque component demand value in response to determining that the torque component demand value must be reduced.

18. The system of claim 15, wherein said adjustment control module is further configured to determine the adjusted flux component demand value such that the difference between the average flux component value and zero is within the first predetermined threshold.

* * * * *